US006469273B2

(12) United States Patent
Botzler et al.

(10) Patent No.: US 6,469,273 B2
(45) Date of Patent: Oct. 22, 2002

(54) METHOD AND DEVICE FOR HEATING METAL COMPONENTS USING ELECTRON IRRADIATION IN A VACUUM CHAMBER

(75) Inventors: Peter Botzler, Langebrück; Carsten Deus, Dresden; Ekkehart Reinhold, Langebrück; Hans-Jochen Student, Pappritz; Lutz Wolkers, Berlin, all of (DE)

(73) Assignee: Siemens Aktiengesellschaft, Munich (DE)

( * ) Notice: Subject to any disclaimer, the term of this patent is extended or adjusted under 35 U.S.C. 154(b) by 5 days.

(21) Appl. No.: 09/821,943

(22) Filed: Mar. 30, 2001

(65) Prior Publication Data

US 2001/0030177 A1 Oct. 18, 2001

Related U.S. Application Data

(63) Continuation of application No. PCT/DE99/03235, filed on Sep. 30, 1999.

(30) Foreign Application Priority Data

Sep. 30, 1998 (DE) ........................................ 198 45 804

(51) Int. Cl.[7] ......................... B23K 15/00; B23K 15/06
(52) U.S. Cl. .............................. 219/121.21; 219/121.31
(58) Field of Search ....................... 219/121.12, 121.21, 219/121.31, 121.32, 121.35, 158

(56) References Cited

U.S. PATENT DOCUMENTS

| | | | |
|---|---|---|---|
| 3,596,045 A | 7/1971 | Steigerwald | |
| 3,624,390 A | * 11/1971 | Watanabe | 250/310 |
| 5,814,784 A | 9/1998 | Kinsman et al. | |

FOREIGN PATENT DOCUMENTS

| | | |
|---|---|---|
| DE | 2638094 | 3/1978 |
| DE | 3508690 A1 | 11/1985 |

OTHER PUBLICATIONS

"Effect of Concentrated Solar Heating on Surface Condition of Stainless Steel", Yu. N. Ivashchenko et al., Applied Solar Energy 26, 1990, No. 3, New York, pp. 77–79.

* cited by examiner

*Primary Examiner*—Samuel M. Heinrich
(74) *Attorney, Agent, or Firm*—Laurence A. Greenberg; Werner H. Stemer; Ralph E. Locher

(57) ABSTRACT

To achieve uniform heating of metal components in all their regions, a method and device for heating metal components using electron irradiation in a vacuum chamber includes multilayer holding elements having an outer layer facing the electron radiation. The outer layer is resistant to heat and exhibits good heat-absorption properties. The holding elements also have an inner layer facing the respective metal component and exhibiting good heat-radiating properties. The holding elements are used to hold the metal components in the vacuum chamber during heating.

11 Claims, 2 Drawing Sheets

METHOD AND DEVICE FOR HEATING METAL COMPONENTS USING ELECTRON IRRADIATION IN A VACUUM CHAMBER

CROSS-REFERENCE TO RELATED APPLICATION

This application is a continuation of copending International Application No. PCT/DE99/03235, filed Sep. 30, 1999, which designated the United States.

BACKGROUND OF THE INVENTION

1. Field of the Invention

The invention relates to a method with which metal components can be uniformly heated, using electron irradiation, over all regions of the metal component in question.

SUMMARY OF THE INVENTION

It is accordingly an object of the invention to provide a method and device for heating metal components using electron irradiation in a vacuum chamber that overcomes the hereinafore-mentioned disadvantages of the heretofore-known devices and methods of this general type and that, while having a relatively simple structure, allows uniform heating of the metal components in all regions.

With the foregoing and other objects in view, there is provided, in accordance with the invention, a method for evenly heating metal components using electron irradiation in a vacuum chamber, including the steps of providing a vacuum chamber having an electron irradiation device for irradiating the chamber, providing multilayer holding elements in the vacuum chamber, the multilayer holding elements having an outer layer facing the electron radiation, the outer layer resistant to heat and exhibiting heat-absorption properties, and an inner layer facing respective metal components held within the holding elements, the inner layer exhibiting heat-radiating properties, and holding at least one metal component in the vacuum chamber with at least one holding element during electron irradiation heating.

The invention achieves its objectives by a method for heating metal components using electron irradiation in a vacuum chamber in which multilayer holding elements, having an outer layer that faces the electron radiation is resistant to heat and exhibits good heat-absorption properties, and an inner layer that faces the respective metal component and exhibits good heat-radiating properties, are used to hold the metal components in the vacuum chamber.

A significant advantage of the method according to the invention is that the components that are to be heated by electron irradiation can be heated uniformly, even in the regions that, in the vacuum chamber, are covered with respect to the electron irradiation because of the need to hold the metal components. The use of multilayer holding elements with a heat-absorbing outer layer ensures that effective introduction of heat takes place while the inner layer, due to its good heat-radiating properties, successfully emits the heat that has been taken up by the outer layer to the respective metal component. Therefore, metal components can be heated homogeneously in all regions by the method according to the invention.

With the objects of the invention in view, there is also provided a configuration for evenly heating metal components, including a vacuum chamber having an electron irradiation device for irradiating the chamber, and multilayer holding elements for holding metal components in the vacuum chamber during electron irradiation heating, said holding elements having an outer layer facing electron radiation from said irradiation device, said outer layer resistant to heat and having heat-absorption properties, and an inner layer facing respective metal components and having heat-radiating properties.

The invention also achieves its objectives by a configuration for heating metal components using electron irradiation in a vacuum chamber having multilayer holding elements for the metal components. The multilayer holding elements have an outer layer that is exposed to the electron irradiation, is resistant to heat, and exhibits good heat-absorption properties, and an inner layer that faces the respective metal component and exhibits good heat-radiating properties.

The configuration according to the invention is advantageous, in particular, because simply by using multilayer holding elements it enables the metal components to be heated homogeneously. The heating is homogeneous because the multilayer holding elements lead to a good uptake of heat and a good emission of heat to those regions of the metal component in question that are shadowed from the electron irradiation by the holding elements. The multilayer holding elements also can be produced relatively simply.

In accordance with another feature of the invention, the multilayer holding elements may be constructed in different ways. It is considered advantageous if the outer layer is a solid part made from tantalum or molybdenum, on which there is a graphite layer as the inner layer.

The advantage of a multilayer holding element so constructed lies, in particular, in the fact that the solid part made from tantalum or molybdenum successfully absorbs the heat applied by the electron irradiation and has low radiation losses. Moreover, such a solid part is heat-resistant and has a property that the graphite layer can be applied thereto with good thermal conductivity. For its part, the graphite layer is advantageous in that it has a high heat-radiation capacity.

In accordance with a further feature of the invention, the outer layer is a solid part made from a metal that tends to form thermally highly stable oxides and on which there is an oxide layer of the metal as the inner layer. The embodiment of a multilayer holding element so configured offers the advantage that the metals that may be considered are able to withstand high temperatures and have a good heat-absorption capacity. The characteristics can be improved still further by the fact that the surface of the solid part, on its side that faces the electron radiation, is improved, for example, by sand-blasting. The oxides ensure good radiation of heat. Moreover, the use of metals tending to form thermally highly stable oxides as the material for the solid part has the advantage that the formation of the oxides may take place while the multilayer holding elements are in use in the vacuum chamber, during the heating process, so that such multilayer holding elements can be produced particularly easily. Moreover, the considerable oxide formation leads to the automatic annealing of possible surface defects and increases the reproducibility of the heating process. The oxide layer is advantageously removed on the outer side of the solid parts to avoid radiation losses.

Chromium, nickel, or aluminum are particularly suitable as metals tending to form thermally highly stable oxides. Thus, in accordance with an added feature of the invention, the metal includes chromium, nickel, and aluminum, and alloys thereof In accordance with a concomitant feature of the invention, a ceramic layer is disposed on an outside of the solid part.

It has proven advantageous if multilayer holding elements with an oxide layer as the inner layer bear a ceramic layer on the outside of the solid part because such a ceramic layer has very good heat-absorption properties but poor heat-conduction properties.

Other features that are considered as characteristic for the invention are set forth in the appended claims.

Although the invention is illustrated and described herein as embodied in a method and device for heating metal components using electron irradiation in a vacuum chamber, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE PREFERRED EMBODIMENTS

Figure 1:
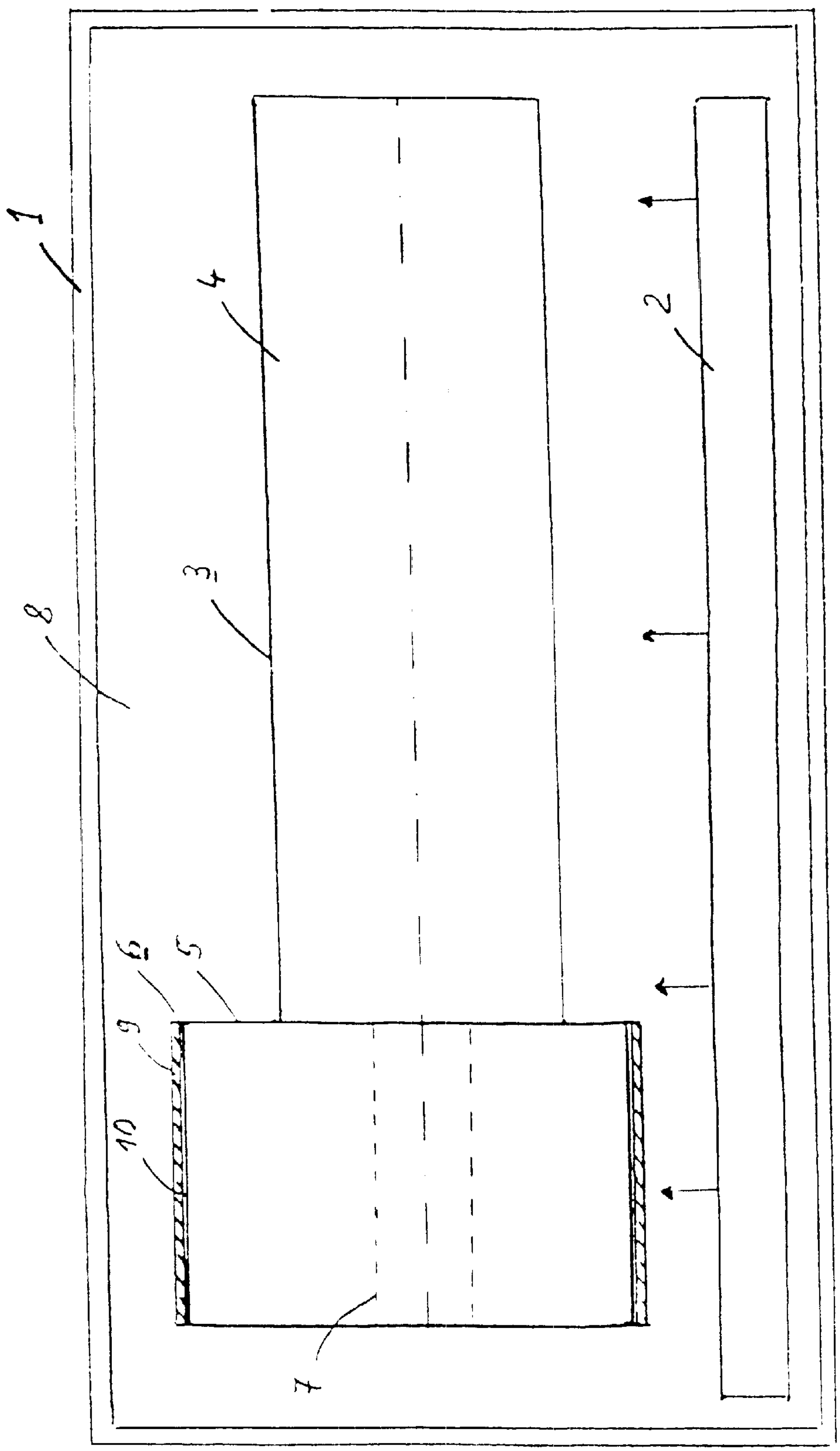
FIG. 1 is a diagrammatic cross-sectional illustration of a metal component to be heated in a chamber together with a multilayer holding element.

In all the figures of the drawing, sub-features and integral parts that correspond to one another bear the same reference symbol in each case.

Referring now to the figures of the drawings in detail and first, particularly to FIG. 1 thereof, there is shown a diagrammatic illustration of a vacuum chamber 1 in which there is a device 2 for electron irradiation. Above the electron irradiation device 2, in the vacuum chamber 1, there is a metal component 3 that is to be heated and may, for example, be a shaft 4 with a flange 5.

The metal component 3 that is to be heated, in the region of its flange 5, is surrounded on the outside by a multilayer holding element 6 that is held on a rear wall 8 of the vacuum chamber 1 by a holding arm 7, which is indicated by dashed lines in FIG. 1. The multilayer holding element 6 has an outer layer 9 that faces the device for electron irradiation 2, is resistant to heat, and has good heat-absorption properties. An inner layer 10 that faces the flange 5 and is made of a material with good heat-radiating properties is connected to the outer layer 9. The two layers 9, 10 of the multilayer holding element 6 are intimately joined to one another and tightly surround the flange 5, thus ensuring good thermal contact.

If heat is introduced into the metal component 3 by electron irradiation, in the direction of the arrows of FIG. 1, by the electron irradiation device 2, the multilayer holding element 6 also absorbs the heat well by its outer layer and passes it on to the inner layer 10. The inner layer 10, in turn, passes the heat on into the flange 5. The heat transfer is due to the good heat-radiating properties of the inner layer 10. Thus, the metal component 3 to be heated is heated to almost exactly the same extent in the region of the flange 5 as in the region of the shaft part 4. Despite the need to use a multilayer holding element 6, it is, therefore, possible to achieve substantially homogeneous heating of the metal component 3 in all its regions. In the exemplary embodiment illustrated, the different mass distribution in flange 5 and shaft 4 is to be taken into account, requiring a correspondingly different metering of radiation in order to achieve homogeneous heating.

Figure 2:
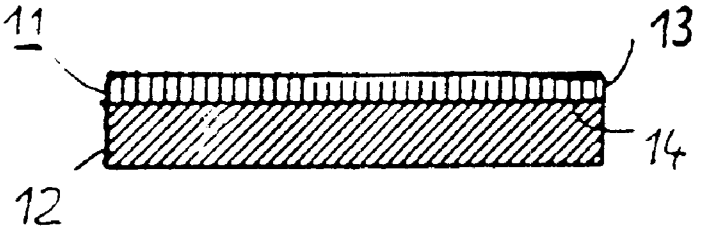
FIG. 2 is a fragmentary, cross-sectional view through the exemplary embodiment of the multilayer holding element of FIG. 1.

In the section through a multilayer holding element 11 (shown in FIG. 2), the outer layer 12 forms a solid part that is made of tantalum or molybdenum. A layer of graphite 13 has been applied to the solid part 12 on its inner side 14 by coating or plating.

Figure 3:
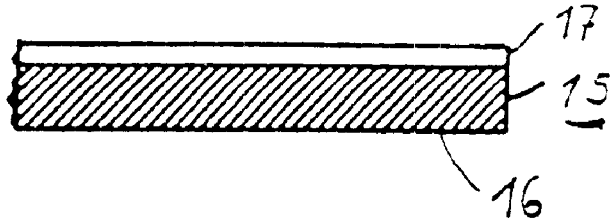
FIG. 3 is a fragmentary, cross-sectional view through a second exemplary embodiment of a multilayer holding element of FIG. 1.

The multilayer holding element 15 illustrated in FIG. 3 is, once again, configured as a holding element made from two layers and is made of, as its outer layer, a solid part 16 made from chromium, nickel, or aluminum, or alloys thereof. An oxide layer on the solid part 16 forms the inner layer 17 of the multilayer holding element 15.

Figure 4:
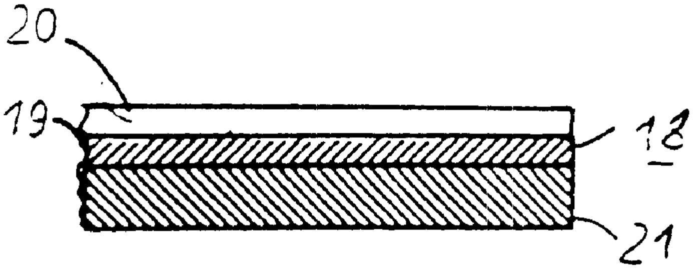
FIG. 4 is a fragmentary, cross-sectional view through a third exemplary embodiment of a multilayer holding element of FIG. 1.

FIG. 4 shows a cross-section through a multilayer holding element 18 with three layers. A solid part 19 is constructed in exactly the same way as the outer layer 16 of the exemplary embodiment shown in FIG. 3, and the inner layer 20, once again, represents an oxide layer on the solid part 19. There is a ceramic layer 21 on the outside of the solid part 19.

Finally, it should be pointed out that the multilayer holding elements might be configured in very different ways. For example, they may serve as holding elements for securely enclosing the metal component that is to be heated in each case or may be used as bearings for the metal components if the components need to be rotated to achieve a good level of heating all the way through. The multilayer holding elements may also be configured as simple supports for the metal components that are to be heated.

We claim:

1. A method for evenly heating metal components using electron irradiation in a vacuum chamber, which comprises:

- providing a vacuum chamber having an electron irradiation device for irradiating the chamber;
- providing multilayer holding elements in the vacuum chamber, the multilayer holding elements having:
  - an outer layer facing the electron radiation, the outer layer resistant to heat and exhibiting heat-absorption properties; and
  - an inner layer facing respective metal components held within the holding elements, the inner layer exhibiting heat-radiating properties; and
- holding at least one metal component in the vacuum chamber with at least one holding element during electron irradiation heating.

2. A configuration for evenly heating metal components, comprising:

- a vacuum chamber having an electron irradiation device for irradiating the chamber; and
- multilayer holding elements for holding metal components in the vacuum chamber during electron irradiation heating, said holding elements having:
  - an outer layer facing electron radiation from said irradiation device, said outer layer resistant to heat and having heat-absorption properties; and
  - an inner layer facing respective metal components and having heat-radiating properties.

3. The configuration according to claim 2, wherein:

said outer layer is a solid part made from at least one of tantalum and molybdenum; and said inner layer is a graphite layer disposed on said outer layer.

4. The configuration according to claim 2, wherein:

said outer layer is a solid part made from a metal tending to form thermally, highly stable oxides; and said inner layer is an oxide layer disposed on said outer layer.

5. The configuration according to claim 4, wherein said metal is one of a group consisting of chromium, nickel, and aluminum, and alloys of chromium, nickel, and aluminum.

6. The configuration according to claim 4, wherein said metal is one of a group consisting of chromium, nickel, aluminum, chromium alloys, nickel alloys, and aluminum alloys.

7. The configuration according to claim 4, wherein said metal is at least one of chromium, nickel, and aluminum, and alloys of chromium, nickel, and aluminum.

8. The configuration according to claim 4, wherein said metal is at least one of chromium, nickel, aluminum, chromium alloys, nickel alloys, and aluminum alloys.

9. The configuration according to claim 3, wherein said solid part has an outside, and a ceramic layer is disposed on said outside of said solid part.

10. The configuration according to claim 4, wherein said solid part has an outside, and a ceramic layer is disposed on said outside of said solid part.

11. In a vacuum chamber having an electron irradiation device for irradiating the chamber, a configuration for evenly heating metal components, comprising:

multilayer holding elements for holding metal components in the vacuum chamber during electron irradiation heating, said holding elements having:

an outer layer facing electron radiation from said irradiation device, said outer layer resistant to heat and having heat-absorption properties; and an inner layer facing respective metal components and having heat-radiating properties.

* * * * *